Feb. 3, 1970  E. J. TASSET  3,493,248
FRAME MEANS FOR AGRICULTURAL IMPLEMENTS HAVING
IMPROVED CASTER WHEEL MEANS
Filed Dec. 11, 1967  3 Sheets-Sheet 1

INVENTOR.
EVERETT J. TASSET
BY John H. Wilkinson
Glen M. Burdick
ATTORNEYS

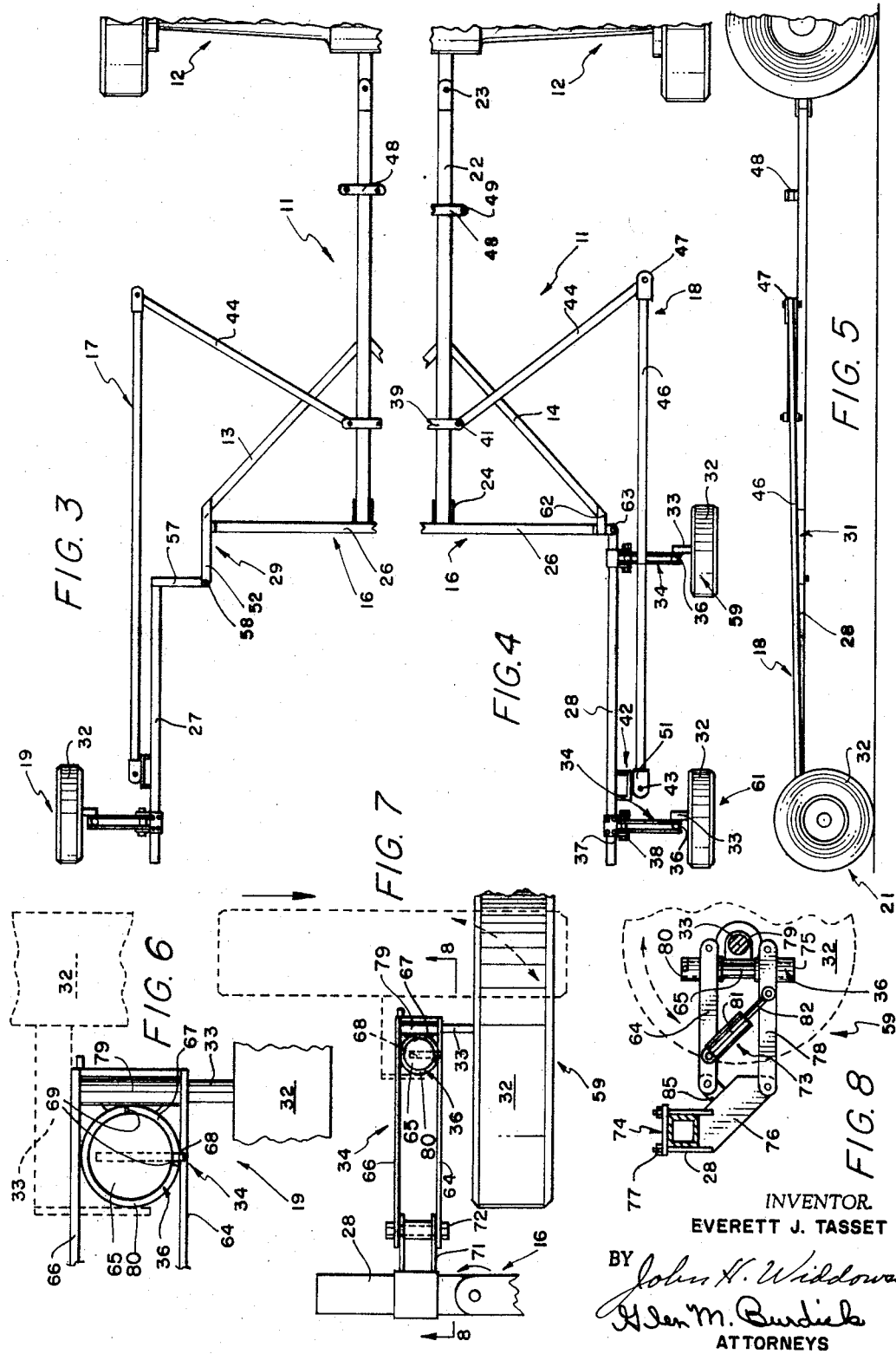

INVENTOR.
EVERETT J. TASSET
BY
ATTORNEYS

United States Patent Office 3,493,248
Patented Feb. 3, 1970

3,493,248
FRAME MEANS FOR AGRICULTURAL IMPLEMENTS HAVING IMPROVED CASTER WHEEL MEANS
Everett J. Tasset, Spearville, Kans., assignor to American Products, Inc., Spearville, Kans.
Filed Dec. 11, 1967, Ser. No. 689,392
Int. Cl. B62d 53/04; B60d 1/14
U.S. Cl. 280—411
6 Claims

ABSTRACT OF THE DISCLOSURE

A frame structure is provided having a tongue portion connectible to a towing means and an elongated support beam connected to and transversely extending the frame structure. A plurality of caster wheel means is pivotally connected to the support beam and the caster wheel means are constructed so that the caster wheels can be pivoted through a radius of 90 degrees. By employing the 90 degree pivot the caster wheels will not whip in use or trailing because the caster wheels will lock by means of inertia in the pivot to prevent such. A cylinder and piston means are carried by the caster wheel means and operatively connected thereto to raise and lower same.

---

This invention relates to implements. In one aspect it relates to foldable frame structures of farm implements. In another aspect it relates to caster wheel means for foldable frame structures. In another aspect it relates to a foldable frame structure having a plurality of caster wheel means which are pivoted in a substantially 90 degrees radius with respect to the elongated support beam of the frame structure so that the caster wheels of the caster wheel means act against each other thus locking the same in pivot and thus causing the frame to trail the towing means. In another aspect it relates to a foldable frame structure having a plurality of caster wheel means and cylinder and piston means mounted on said caster wheel means to raise and lower the same.

With the increased use of power apparatus on farms there has come about an increase in the size and wdith of the agricultural implements adapted to work large swaths of ground in a single path. However, with the increased width of such implements, problems have been incurred in adapting such implements so that they can be transported along a highway or moved through gates and the like. Several methods have been devised to solve the problem of transportation and the like but the structures have required expensive, complicated auxiliary parts which are subject to frequent breakdown and which quite naturally increase the cost of the implement.

Further, the devices of the prior art many times suffer from the disadvantage in that the complexity of the design readily allows variations in the wheel means and these variations prevent the frame structure from trailing properly thus causing the implement to whip when being towed or else requiring that the implement be moved very slowly from one location to another which is undesirable as it is time consuming and thus wasteful to the farmer.

Further, additions which are made on the prior art devices often increase the frame structure substantially in size and weight and thus making it difficult to transport the implement. Further, frequent break-downs are incurred due to stress and strain placed on the wheel means when the same are in the transporting position.

It is desirable to raise the wheel means of the implement when the implement is being positioned in an extended working position from the folded position and visa versa thus preventing damage to the wheel means. Further, it is desirable that the wheel means be constructed so that undue stress and strain is not placed on piston and cylinder means and the like thereby causing damage to the linkage members when the implement is both in a working position and in a trailing position for transportation from one area to the next.

According to the present invention I have now provided a frame means for agricultural implements having improved caster wheel means which is structurally count, economical to manufacture, simple to operate, and which does not suffer from the above-mentioned disadvantages of the prior art. The caster wheel means of the present invention provide a quick, easy, and simple manner in which to adjust the caster wheels without the need for expensive auxiliary tools and equipment.

Further according to the invention, I have provided a frame means for agricultural implements having a frame member and a support beam connected to said frame member and transversely extending therefrom having a plurality of caster wheel means pivotally connected to the support beam. Each of the caster wheel means is provided with a caster wheel which can be pivoted through a radius of substantially 90 degrees. A cylinder and piston means is likewise carried by said caster wheel means and said caster wheel means and cylinder and piston means are assembled and constructed so that upon operation of lowering said caster wheel means, and thus said caster wheels, said caster wheels can be pivoted through a radius of substantially 90 degrees so that they act against each other thereby preventing the frame means from whipping while in use or trailing because the caster wheels will lock by means of inertia in the pivot to prevent such.

Further according to the invention, I have provided a frame structure having a tongue portion connectible to a towing means and a sectional support beam having a central section and opposed end sections pivotally connected thereto and transversely extending therefrom. A pair of folding link means is provided and each is pivotally connected at its rearwardly extending end portion to one of said opposed end sections, and pivotally connected at its forwardly extending end portion to said tongue portion. The sectional support beam and the folding link means are assembled and constructed so that the opposed end sections can be folded readwardly and substantially perpendicular to the central section of said support beam thus allowing said frame means to be transported and the like.

Further according to the invention, I have found that by pivotally connecting the caster wheel means to the opposed end sections of said sectional support beam and by providing a caster wheel means which can be pivoted through a radius of substantially 90 degrees that upon folding the opposed end sections rearwardly and pivoting the caster wheel means through the radius of substantially 90 degrees that the folded frame structure can be caused to trail the towing means without a whipping action of the frame means.

Further according to the invention, I have found that by mounting a cylinder and piston means on said caster wheel means that said cylinder and piston means can be activated thus causing the wheel portion of said caster wheel means to be raised and lowered in response thereto thus facilitating the pivoting movement of the caster wheels without damage thereto.

Further according to the invention, I have found that by employing a plurality of caster wheel means having a 90 degree radius of pivot that the frame will not whip in use or traveling because the wheels will lock in the pivot to prevent such due to the force applied upon the wheels by the opposed wheel and the frame itself.

Further according to the invention, I have found that by employing a plurality of caster wheel means and each caster wheel means is provided with a wheel and the axial member fixably attached to a first support member which is connected to a pivoting member having a 90 degree radius opening positioned therein so that the combination of the pivoting member and suport member are maintained perpendicular to each other that a pin element mounted on said axial member at a point removed from said wheel and communicating with said 90 degree radius opening in said pivoting member that the movement of said caster wheel means within the 90 degree radius is readily controlled and stabilized.

An object of this invention is to provide a frame means for agricultural implements having improved caster wheel means.

Another object of this invention is to provide a unique caster wheel means for a frame structure.

Another object of this invention is to provide a novel caster wheel means for a rearwardly foldable frame structure wherein the caster wheel means can be raised or lowered in response to a cylinder and piston means mounted thereto.

Another object of the invention is to provide a caster wheel means for a foldable frame structure that provides quick, easy, and simple adjustments thereof.

Another object of this invention is to provide a foldable frame structure having caster wheel means which is structurally sound, economical to manufacture, simple to operate, and thus provides for an improved frame structure for agricultural equipment.

Various other objects, advantages, and features of the invention will become apparent to those skilled in the art from a study of the drawings, the written description, and the appended claims.

Drawings accompany and are a part of this disclosure. These drawings depict preferred specific embodiments of the frame means for agricultural implements having improved caster wheel means of the invention, and it is to be understood that these drawings are not to unduly limit the scope of the invention.

In the drawings:

FIG. 3 is a fragmentary top plan view of the frame structure having improved caster wheel means of the present invention wherein the frame structure is in a folded position to illustrate the trailing effect of the caster wheel means.

FIG. 4 is a fragmentary top plan view of the frame means having improved caster wheel means wherein four caster wheel means are employed on the frame structure and wherein the frame structure is in a folded position.

FIG. 5 is a side plan view of the frame structure of FIG. 3.

FIG 6 is a fragmentary enlarged top plan view of the caster means of FIG. 1.

FIG. 7 is an enlarged top plan view of the caster wheel means of FIG. 4.

FIG. 8 is an enlarged elevational view of the caster wheel means and cylinder and piston means of FIG. 7 taken along line 8—8.

Figures 1, 2:
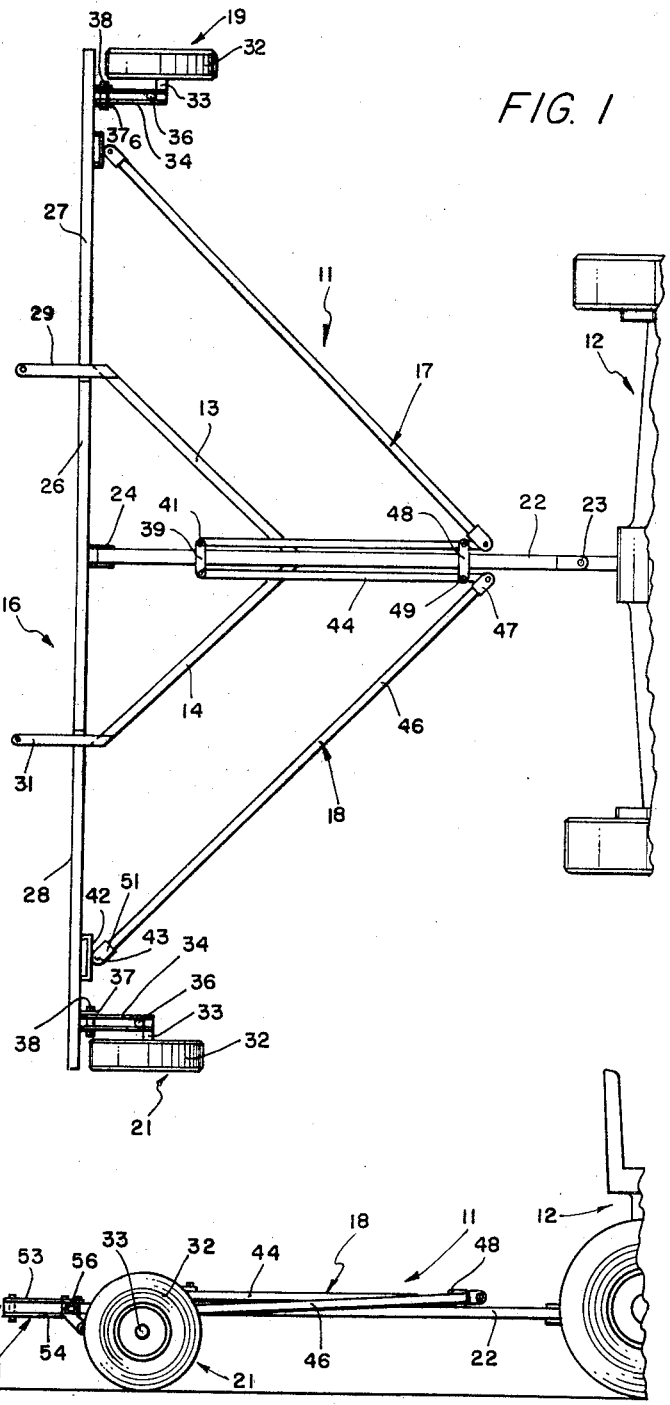
FIG. 1 is a top plan view of the frame means for agricultural implements having improved caster wheel means of the present invention.
FIG. 2 is a side plan view of the frame means having improved caster wheel means of FIG. 1.

The following is a discussion and description of preferred specific embodiments for the frame means for agricultural implements having improved caster wheel means of this invention, such being made with reference to the drawings whereupon the same reference numerals are used to indicate the same or similar parts and/or structures. It is to be understood that such discussion and description is not to unduly limit the scope of the invention. In the following description of the drawings only one element of a plurality of similar elements will be described in detail for the sake of simplicity.

Referring now to the drawings in detail, and in particular to FIGS. 1 and 2, there is shown a foldable frame structure 11 connected to a conventional farm tractor 12 or the like. Frame structure 11 is provided with a pair of forwardly converging elongated linkage members 13 and 14, a sectional support beam 16, a pair of forwardly converging folding link means 17 and 18, and a pair of caster wheel means 19 and 21. Forwardly converging elongated linkage members 13 and 14 are connected at their forwardly extending end portions to tongue member 22 having an aperture 23 in its forward end portion for connecting frame structure 11 to a tractor 12, and the like. The rearwardly extending end portion of tongue member 22 is connected to sectional support beam 16 by any suitable means such as bracket means 24. The rearward most end portions of elongated linkage members 13 and 14 are connected to sectional support beam 16 through hinge means 29 and 31, respectively, by any suitable means such as welding, bolting, and the like.

Sectional support beam 16 is provided with central section 26 having opposed end sections 27 and 28 pivotally connected to central section 26 by hinge means 29 and 31. Central section 26 and opposed end sections 27 and 28 are preferably formed of a square shape or rectangular tubing material and positioned so that central section 26 and opposed end sections 27 and 28 can be aligned through hinge means 29 and 31 or opposed end sections 27 and 28 can be rearwardly folded with respect to central section 26 at hinge means 29 and 31. Opposed end sections 27 and 28 of sectional support beam 16 are supported by a pair of caster wheel means 19 and 21 which are pivotally mounted thereto as is shown.

Caster wheel means 19 and 21 are each provided with wheel member 32 positioned at the outer end portion of opposed end sections 27 and 28. Wheel member 32 is operably connected to axial spindle 33 which, in turn, is connected to support means 34. Pivot member 36 is then connected to support means 34 and support means is then pivotally connected to opposed end sections 27 and 28 by bracket 37 and pin element 38.

Forwardly convering folding link means 17 and 18 are pivotally connected at their forward end portion to tongue member 22 of frame structure 11 by connecting means 39 and pin elements 41. Connecting means 39 is connected to tongue member 22 by any suitable means such as welding, bolting, and the like. Folding link means 17 and 18 are pivotally connected at their rearward most end portions to opposed end sections 27 and 28 of sectional support beams 16, respectively, by bracket means 42 and pin element 43. Folding link means 17 and 18 are each provided with link members 44 and 46 which are pivotally connected at their adjacent ends by hinge means 47. Link members 44 and 46 of folding link means 17 and 18 can be maintained in a folded position, as shown in FIG. 1, by positioning link member 44 within lock member 48 thus maintaining frame structure 11 in an extended working position. Lock member 48 can be provided with pin element 49 which communicates with an opening in link member 44 of folding link means 17 and 18 so that when opposed end sections 27 and 28 are aligned with central section 26 of sectional support beam 16 pin element 49 can be positioned within lock member 48 and link member 44 thereby securing the same in position. When it is desirable to position frame structure 11 in a folded position pin element 49 is removed from lock member 48 and link member 44 thus allowing opposed end sections 27 and 28 of sectional support beam 16 to be moved in a rearwardly direction with respect to central section 26.

Referring now to FIG. 2, forwardly converging elongated linkage member 18 is shown having link member 44 positioned within lock member 48 which is mounted on the upper surface of tongue member 22. As can readily be seen link member 44 and thus the forwardly extending end portion of link member 46 are caused to rise up and over tongue member 22 and thus contact lock member 48 carried by tongue member 22. This rising effect of link member 44 can be caused either manually or by positioning hinge means 51 connecting the rearwardly extending end portion of linkage member 46 at an angle with bracket means 42 which connects the same to opposed end section 28 of sectional support beams 16 so that hinge means 51 connecting link member 46 to bracket means 42 has an inclined axis relative to the substantially horizontal axis through bracket means 42. The degree of inclination of the angle varies depending upon the length of sectional support beam 16. The angle is generally in the range of about 5 to 11 degrees.

Referring now to FIG. 3 frame structure 11, depicted in FIG. 1, is shown in a folded, trailing position. As is readily apparent, by the unique design of hinge means 29 cooperating with folding link means 17 opposed end section 27 of sectional support beam 16 can be caused to be extended in a rearwardly direction with respect to central section 26. By the unique design of the caster wheel means 19 and 21 (not shown) which will be described in detail later, upon moving the opposed end section 27 of sectional support beam 16 in a rearwardly direction wheel member 32 of caster wheel means 19 is allowed to rotate through a radius of substantially 90 degrees thus maintaining the wheel in a tracking position behind the towing vehicle such as tractor 12.

Referring now to FIG. 2 in conjunction with FIG. 3 hinge means 29 which allows opposed end sections 27 of sectional support beam 16 to be moved in a rearwardly direction with respect to central section 26 and at the same time maintain opposed end sections 27 and central section 26 in a horizontal position will be discussed in detail. Hinge means 31 (not shown) is identical both in design and function thus permitting opposed end section 28 to likewise be moved in a rearward direction with respect to central section 26. Hinge means 29 is provided with a yoke member 52 having two parallel leg members 53 and 54 maintained in a spaced relationship with each other by base member 56 connected on end to each of leg members 53 and 54. Base member 56 of hinge means 29 is then connected to linkage member 13 by any suitable means, such as welding so that the open portion of member 52 of hinge means 29 is then fixedly mounted on the end portion of central section 26 of sectional support beam 16 by any suitable means such as welding, bolting, and the like and a substantial portion of yoke member 52 extends rearwardly from sectional support beam 16. The rearwardly extending end portion of leg members 53 and 54 of yoke member 52 are each provided with an axially aligned opening therein. Opposed end section 27 of sectional support beam 16 is provided with a generally L-shaped end portion 57 which is pivotally connected to and positioned within yoke member 52 by pin element 58. The combination and design of the rearwardly extending yoke portion of hinge means 29 and the L-shaped end portion of opposed end section 27 of sectional support beam 16 allow L-shaped end portion 57 to be positioned within yoke member 52 when opposed end section 27 is aligned with central section 26 of sectional support beam 16 as shown in FIG. 1, or pivoted and removed from yoke member 52 when opposed end section 27 is caused to extend rearwardly from central section 26 of sectional support beam 16 as shown in FIG. 3.

The positioning of folding link means 17 and 18 and caster wheel means 19 and 21 when frame structure 11 is in a folded position is shown in FIGS. 3 and 5. As link member 44 of folding link means 17 and 18 is withdrawn from lock member 48 opposed end sections 27 and 28 are moved, through hinge means 29 and 31 in a rearwardly direction with respect to central section 26 of sectional support beam 16. Upon the rearward movement of opposed end sections 27 and 28 wheel member 32 of caster wheel means 19 and 21 are pivoted through a radius of substantially 90 degrees thus positioning the same as shown.

Referring now to FIG. 4 foldable frame structure 11 connected to a conventional farm tractor 12 and the like is shown. Frame structure 11 is provided with forwardly converging elongated linkage member 14, a sectional support beam 16, and forwardly converging folding link means 18 and a pair of caster wheel means 59 and 61. Forwardly converging elongated linkage member 14 is connected at its forwardly extending end portion to tongue member 22 having an aperture 23 in its forward end portion for connecting frame structure 11 to tractor 12 and the like. The rearwardly extending end portion of tongue member 22 is connected to sectional support beam 16 by any suitable means such as bracket means 24. The rearward most end portion of elongated linkage member 14 is connected to sectional support beam 16 by connecting member 62 which is mounted on sectional support beam 16 by any suitable means such as welding, bolting, and the like.

Sectional support beam 16 is provided with the central section 26 having opposed end section 28 pivotally connected to central section 26 by hinge means 63. Central section 26 and opposed end section 28 are preferably formed of square shape or rectangular tubing material and positioned so that central section 26 and opposed end section 28 can be aligned through hinge means 63 or opposed end section 28 can be rearwardly folded with respective central section 26 at hinge means 63. A similar opposed end section (not shown) is connected to the other end portion of central support beam 26 and is identical in structure and function to opposed end section 28 shown in the drawing. Opposed end section 28 of sectional support beam 16 is supported by a pair of caster wheel means 59 and 61 which are pivotally mounted near the two end portions of opposed end sections 28 as shown.

Caster wheel means 59 and 61 are each provided with a wheel member 32 which is operatively connected to axial spindle 33 which, in turn, is connected to support means 34. Pivot member 36 is then connected to support means 34 and support means 34 is then pivotally connected to the end portions of opposed end section 28 by bracket 37 and pin element 38.

Forwardly converging folding link means 18 is pivotally connected at its forward end portion to tongue member 22 of frame structure 11 by connecting means 39 in the pin element 41. Connecting means 39 is connected to tongue member 22 by any suitable means such as welding, bolting, and the like. Folding link means 18 is pivotally connected at its rearward most end portion to opposed end section 28 of sectional support beam 16 by bracket means 42 and pin element 43. Folding link means 18 is provided with link members 44 and 46 which are pivotally connected at their adjacent ends by hinge means 47. Link members 44 and 46 of folding link means 18 can be maintained in a folded position, as shown in FIG. 4, or in an extended working position similar to the frame shown in FIG. 1. Link members 44 and 46 of folding link means 18 can be maintained in the folded position as shown in FIG. 4 by positioning link member 44 within lock member 48. Lock member 48 can be provided with a pin element 49 which communicates with an opening in link member 44 of folding link means 18 so that when opposed end section 28 is aligned with central section 26 of sectional support beam 16 pin element 49 can be positioned within lock member 48 and link member 44 thereby securing the same in position. When it is desirable to position frame structure 11 in a folded position pin element 49 is removed from lock member 48 and link member 44 thus allowing the opposed end section 28 of sectional support beam 16 to be moved in a rearward direction with respect to central section 26 of sectional support beam 16. As can readily be seen and as previously discussed in conjunction with FIG. 2 link member 44 and thus forwardly extending end portion of link member 46 must rise up and over tongue member 22 in order to contact lock member 48 carried by tongue member 22. This rising effect of link member 44 can be caused either manually or by positioning hinge means connecting the rearwardly extending end portion of linkage member 46 at an angle with bracket means 42 which connects the same to opposed end section 28 of sectional support beam 16 so that the hinge means 51 connecting link member 46 to bracket means 42 has an inclined axis relative to the substantially horizontal axis through bracket means 42. The degree of inclination of the angle varies depending upon the length of said sectional support beam 16. The angle is generally in the range of about 5 to 11 degrees. Hinge means 51 cooperating with folding link means 18 allows opposed end section 28 of sectional support beam 16 to be extended rearwardly with respect to central section 26 of sectional support beam 16. Caster wheel means 59 and 61, which will be described in detail hereinafter, are designed so that upon moving the opposed end section 28 of sectional support beam 16 in a rearwardly direction wheel members 32 of caster wheel means 59 and 61 are allowed to rotate through a radius of substantially 90 degrees thus maintaining the wheels in a tracking position behind the towing vehicle, such as tractor 12. Opposed end section 27 (not shown) is likewise provided with two caster wheel means. Both caster wheel means function similarly and the additional caster wheel means are desirable to furnish additional support when operating an over-sized, long, sectional support beam or when carrying cumbersome end heavy equipment. By the nature of the design of bracket means 42 and hinge means 51 and thus rearwardly extending end portion of link member 46 of folding link means 18, the frame structure 11 when in a folded position, as shown in FIG. 4, prevents the frame structure from folding beyond a point of 90 degrees with respect to central section 26 of sectional support beam 18 thereby insuring that the frame structure 11 will be folded in the desired manner.

Hinge means 63 which connects central section 26 to opposed end section 28 can be any suitable hinge which allows opposed end section 28 to be moved rearwardly through a radius of 90 degrees with respect to central section 26 of sectional support beam 16.

Lock member 48 which is employed to secure link member 44 of folding link means 18 in a secured position thereby maintaining opposed end section 28 in an aligned position with central section 26 of sectional support beam 16 can be any suitable means which are known in the art. In addition to the pin type lock member hereinbefore described excellent results can be obtained wherein lock member 48 is designed to maintain linkage member 44 in place by friction. For example, lock member 48 can be provided with a clip means such as disclosed in the copending application entitled Foldable Frame For Agricultural Implements filed Oct. 9, 1967, Ser. No. 673,782.

Referring now to FIG. 6, caster wheel means 19 of the present invention is shown in detail. Caster wheel means 19 is provided with a wheel member 32 operably connected to one end of axial spindle 33 and the other end portion of axial spindle 33 is provided with collar member 79 which is connected to and supported from support means 34 and pivot member 36 as shown.

Support means 34 is provided with a pair of support members 64 and 66 which are maintained in a spaced relationship with each other and are pivotally mounted at one end to the sectional support beam of the frame structure. A second pair of support members (not shown) are positioned parallel to support members 64 and 66 and below and in a spaced relation therewith.

Pivot member 36, which is shown more clearly in FIG. 8, is mounted between support members 64 and 66 as shown. Pivot member 36 is provided with a shaft member 65 having rotatable collar members 75 (not shown) and 80 positioned on each end portion thereof. Collar member 80 is provided with a recessed opening 67 in its upper portion and recessed opening 67 extends through a radius of substantially 90 degrees of collar member 80. A pin element 68 is positioned within one end portion of shaft member 65 so that one end of pin element 68 communicates with recessed opening 67 of the upper portion of collar member 80 of pivot member 36 thus insuring that wheel member 32 does not rotate beyond the radius of recessed opening 67. Shaft member 65 of pivot member 36 is fixably secured to collar member 79 of axial spindle 33. When it is desirable to adjust the radius to a smaller radius from the substantially 90 degree radius as shown, a screw attachment 69 can be placed on the upper portion of collar member 80 of pivot member 36 and the radius can be reduced by adjusting the screw to contact pin element 68 thus reducing the radius of recessed opening 67 through which pin element 68 is allowed to travel. As is clearly evident in the drawings the movement of wheel member 32 through the rotation of pin element 68 within recessed opening 67 of collar member 80 of pivot member 36 is illustrated to be substantially a 90 degree rotation. This rotation is an important factor of the present invention in that as the frame member 11 is positioned so the opposed end sections of the sectional support beam extend rearwardly pivot member 36 allows the wheels of the caster wheel means to be pivoted substantially 90 degrees thereby positioning them in a trailing position. The dashed line portion of the drawing illustrates the 90 degree movement of the wheel member. The outward inertia of the opposed wheel members of the caster means on the opposed end sections of the sectional support beam maintains the same against the edge portion of the recessed opening within the pivot member thereby insuring that the frame will travel in a true and aligned position behind the towing vehicle without producing a whipping motion and without the need for an auxiliary connecting means.

Referring now to FIG. 7, caster wheel means 59 of FIG. 4 is shown in detail. Caster wheel means 59 is provided with a wheel member 32 operatively connected to one end of axial spindle 33 and the other end portion of axial spindle 33 is provided with collar member 79 which is connected to and supported by support means 34 and pivot member 36 as shown. Support means 34 is provided with a pair of parallel support members 64 and 66 which are maintained in a parallel spaced relationship with each other, and support members 64 and 66 are pivotally connected at one end by bracket 71 and pin element 72 to opposed end section 28 of sectional support beam 16. A second pair of support members (not shown) identical to support members 64 and 66 are positioned below support members 64 and 66 and in a parallel spaced relationship. Pivot member 36 is positioned between support members 64 and 66 and the second pair of support members (not shown).

Pivot member 36, which is shown more clearly in FIG. 8, is mounted between support members 64 and 66 as shown. Pivot member 36 is provided with a shaft member 65 having rotatable collar members 75 (not shown) and 80 positioned on each end portion thereof. Collar member 80 is provided with a recessed opening 67 in its upper portion and recessed opening 67 extends through a radius of substantially 90 degrees of collar member 80. A pin element 68 is positioned within one end portion of shaft member 65 so that one end of pin element 68 communicates with recessed opening 67 of the upper portion of collar member 80 of pivot member 36 thus insuring that wheel member 32 does not rotate beyond the radius of recessed opening 67. Shaft member 65 of pivot member 36 is fixably secured to collar member 79 of axial spindle 33. By the construction of pivot member 36 and pin element 68, pin element 68 follows the opening therein thus insuring that wheel member 32 of caster wheel means 59 does not rotate beyond the radius of the recessed opening in the pivot member. When it is desirable to adjust the radius to a smaller radius from the substantially 90 degree radius as shown, a screw attachment similar to that in FIG. 6 can be placed on collar member 80 of pivot member 36 and the radius can be reduced by adjusting the screw attachment so that it reduces the radius of the recessed opening 67 so that pin element 68 contacts the screw attachment thus reducing the radius through which pin element 68 and thus wheel member 32 can rotate. As is clearly evident from the drawings, the movement of wheel member 32 through the rotation of pin element 68 within recessed opening 67 of collar member 80 of pivot member 36 is substantially a 90 degree rotation. The dashed line illustrates the 90 degree rotation of wheel member 32. The pivoting of wheel member 32 is an important factor of the present invention in that as the frame member is positioned so that the opposed end section of the sectional support beam extend rearwardly with respect to the central section pivot member 36 allows the wheels of the caster wheel means to be pivoted substantially 90 degrees thus positioning them in a trailing position. As has previously been mentioned regarding FIG. 6 the outward directed force of the opposed wheel members of the opposing caster wheel means on the opposed end section of the sectional support beam maintain pin element 68 against the edge portion of recessed opening 67 in pivot member 36 thereby insuring that the frame will travel in a true and aligned position behind the towing vehicle.

Referring now to FIG. 8 caster wheel means 59 is illustrated cooperating with cylinder and piston means 73 which are employed to raise and lower wheel member 32 of caster wheel means 59 when desired. A similar cylinder and piston means is mounted on all of the caster wheel means illustrated in the drawings.

Opposed end section 28 of sectional support beam 16 is illustrated positioned within clamp means 74 to which is mounted bracket 76. Clamp means 74 maintains opposed end section 28 therein by means of any suitable means such as bolts 77. Support member 78 is pivotally connected at one end to bracket 76 mounted on opposed end section of sectional support beam 28 and support member 64 is pivotally connected at one end to linkage member 85 which, in turn, is connected to bracket 76. Support members 64 and 78 are pivotally attached to collar members 75 and 80 of pivot member 36 at the other end and support members 64 and 78 are maintained in a fixed relationship perpendicular to pivot member 36. Collar member 79 of axial spindle 33 is fixably connected to shaft member 65 of pivot member 36. Collar member 79 is positioned between support members 64 and 78 as shown. Cylinder and piston means 73 is a hydraulic cylinder 81 having a reciprocating shaft member 82. The end portion of shaft member 82 is pivotally connected to support member 78 and hydraulic cylinder 81 is pivotally connected at its end portion removed from shaft member 82 to support member 64. Hydraulic cylinder 81 and shaft member 82 are constructed and assembled so that upon activation of hydraulic cylinder 81 and thus shaft member 82 wheel 32 of caster wheel means 59 is raised or lowered in response to the movement of shaft member 82. Pivot member 36 is shown having recessed opening 67 in collar member 80 and pin element 68 positioned within shaft member 65 at its upwardly extending end portion and extending into opening 67 thus controlling the movement of wheel member 32 as has previously been discussed.

Figure 9:
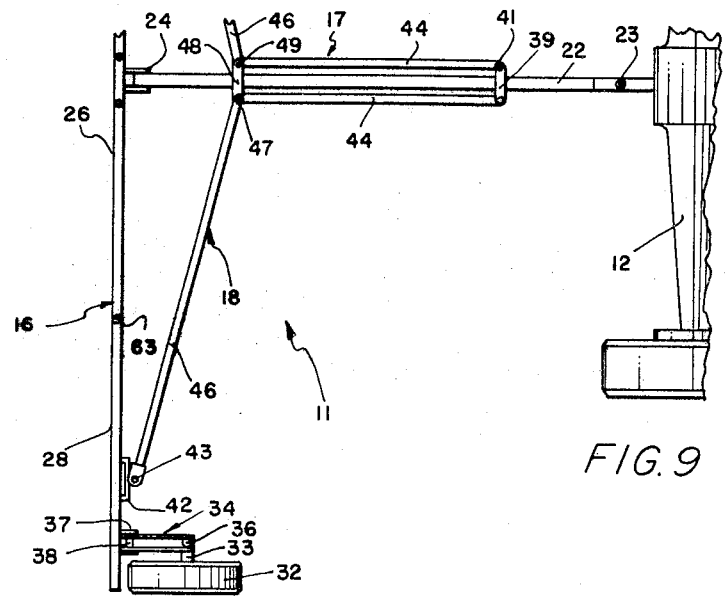
FIG. 9 is a fragmentary top plan view of another embodiment of the foldable frame means having improved caster wheel means.
Figure 10:
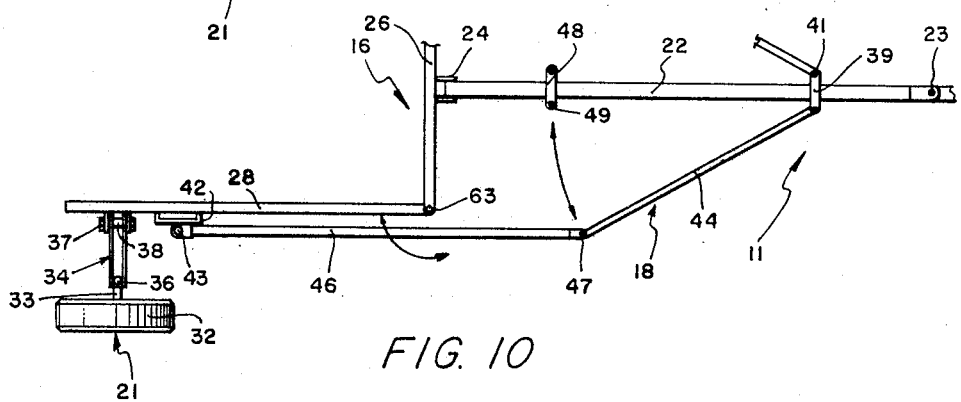
FIG. 10 is a fragmentary top plan view of the frame means of FIG. 9 in a folded trailing position.
Figure 11:
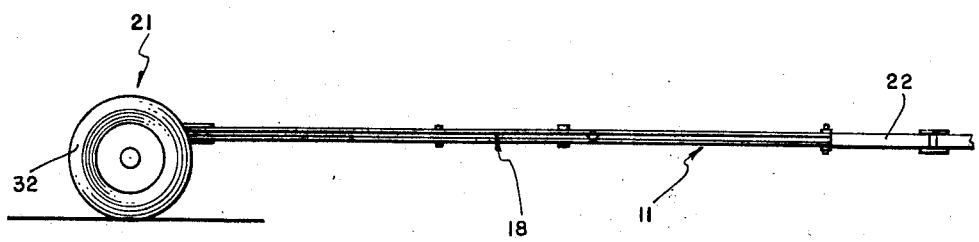
FIG. 11 is a side plan view of FIG. 10 showing the frame structure in a folded position wherein the end section of a sectional support beam is supported by the caster wheel means.

Referring to FIGS. 9, 10, and 11 another embodiment of the frame means for agricultural implements having improved caster wheel means is depicted employing a different folding means.

Referring now to FIGS. 9 and 10 there is shown a foldable frame structure 11 connected to the conventional farm tractor 12 and the like. Frame structure 11 is provided with a tongue member 22, a pair of forwardly converging folding link means 17 and 18, a pair of caster wheel means 19 and 21, only one of which is shown, and a sectional support beam 16. Tongue member is connected at its rearwardly extending end portion to sectional support beam 16 by bracket means 24 and the forwardly extending end portion of tongue member 22 is provided with aperture 23 for connecting tongue member 22 and thus frame structure 11 to tractor 12 and the like.

Sectional support beam 16 is provided with central section 26 having opposed end section 28 pivotally connected to central section 26 by hinge means 63. Another opposed end section (not shown) is similarly constructed connected to central section 26 but for the sake of simplicity only opposed end section 28 will be discussed. Central section 26 and opposed end section 28 are preferably formed of a square shaped or rectangular tubing material and positioned and constructed so that central section 26 and opposed end section 28 can be aligned through hinge means 63 or opposed end section 28 can be rearwardly folded with respect to central section 26 at hinge means 63. Opposed end section 28 of sectional support beam 16 is supported by caster wheel means 21 which is pivotally mounted thereto.

Caster wheel means 21 is provided with wheel member 32 positioned at the outer end portion of opposed end sections 27 and 28. Wheel member 32 is operably connected to axial spindle 33 which, in turn, is connected to support means 34. Pivot member 36 is then connected to support means 34 and support means 34 is then pivotally connected to opposed end section 28 by bracket 37 and pin element 38.

Forwardly converging folding link means 17 and 18 are pivotally connected at their forward end portion to tongue member 22 of frame structure 11 by connecting means 39 and pin elements 41. Connecting means 39 is connected to tongue member 22 by any suitable means such as welding, bolting, and the like. Folding link means 17 and 18 are pivotally connected at their rearward most end portions to opposed end sections 27 and 28 of sectional support beams 16, respectively, by bracket means 42 and pin element 43. Folding link means 17 and 18 are each provided with link members 44 and 46 which are pivotally connected at their adjacent ends by hinge means 63. Link members 44 and 46 of folding link means 17 and 18 can be maintained in a folded position, as shown in FIG. 9, by positioning link member 44 within lock member 48 thus maintaining frame structure 11 in an extended working position.

Lock member 48 is mounted on tongue member 22 and is positioned at a point intermediate connecting means 39 and sectional support beam 16. Lock member 48 can be provided with pin element 49 which communicates with an opening in link member 44 of folding link means 17 and 18 so that when opposed end sections 27 and 28 (not shown) are aligned with central section 26 of sectional support beam 16 pin element 49 can be positioned within lock member 48 and link member 44 thereby securing the same in position. As can readily be seen in FIG. 9 the forwardly converging folding link means 17 and 18 fold rearwardly toward sectional support beam 16 and link members 44 are positioned parallel to tongue member 22 when frame structure 11 is in an extended working position.

Referring now to FIG. 10, the foldable frame structure of FIG. 9 is shown in the folded, trailing position which is employed when transporting the frame structure and thus the implement thereon from one location to another, through gates and the like, and upon the highway. When positioning frame structure 11 in the folded position as shown in FIG. 10, link member 44 of folding link means 18 is removed from lock member 48 thus allowing opposed end section 28 of sectional support beam 16 to be moved in a rearwardly extended direction with respect to central section 26 and wheel member 32 of caster wheel means 21 is rotated through a radius of substantially 90 degrees to position wheel member 32 in the trailing position as illustrated.

The trailing position as illustrated in FIG. 11 from a side view illustrates the relative position of caster wheel means 21 and thus wheel member 32 with respect to forwardly converging folding link means 18 and tongue member 22 of frame structure 11 when frame structure 11 is in the folded trailing position.

By employing the unique caster wheel means of the present invention in conjunction with a foldable frame structure it has been found that frame structure can be towed at speeds up to 50 m.p.h. without producing any whipping action of the trailing frame structure. Desirable results have been obtained wherein the pivot member of the caster wheel means is a tubular member having a 90 degree recessed step portion in one end thereof. The unique design of the caster means wherein the counter acting forces caused by the two or four wheels acting against each other produced a stabilizing effect upon the wheel member of the caster wheel means thereby preventing the whipping type action which is prevalent in most trailing type structures. Therefore, it is clearly evident that by employing the unique design of the caster wheel means, along with the foldable frame structure, that desirable, useful, and a highly economical, maintenance free foldable frame structure having improved caster wheel means is provided.

The foregoing discussion and decription has been made in connection with preferred specific embodiments of the frame means for agricultural implements having improved caster wheel means of the invention. However, it is to be understood that the discussion and description is only intended to illustrate and teach those skilled in the art how to practice the invention.

I claim:
1. A frame means for implements, comprising:
   (a) a frame structure having a tongue portion connectible to a towing means;
   (b) an elongated support beam connected to said frame structure and transversely extending therefrom;
   (c) a plurality of caster wheel means pivotally connected to said elongated support beam so that said caster wheel means can be pivoted substantially 90 degrees;
   (d) cylinder and piston means carried by said caster wheel means;
   (e) said support beam having pivotally connected outer end sections and a pair of folding link means connected to respective ones of said end sections;
   (f) each of said link means having first and second link members pivotally connected to each other and to said tongue portion and said end sections, respectively; and
   (g) said second link members movable outwardly and rearwardly to position same and said end sections parallel to said tongue portion in the trailing condition with said caster wheel means acting against each other and thus causing said frame structure to trail said towing means.

2. The frame means according to claim 1 wherein said caster wheel means comprises:
   (a) a plurality of wheels, each of said wheels operably connected to one end of an axial spindle;
   (b) a pivot member having a shaft member fixably secured to said axial spindle;
   (c) a rotatable collar member connected to the upward extending end portion of said shaft member, said rotatable collar member having a substantially 90 degree radius opening positioned therein; and
   (d) a pin element carried by said shaft member and positioned therein so that one end portion of said pin element communicates with said opening in said collar member thus controlling the pivoting movement of said wheels of said caster wheel means.

3. A frame means for implements comprises:
   (a) a frame structure having a tongue portion connectible to a towing means;
   (b) an elongated support beam connected to said frame structure and transversely extending therefrom;
   (c) a plurality of caster wheel means pivotally connected to said elongated support beam so that said caster wheel means can be pivoted substantially 90 degrees;
   (d) said caster wheel means having a plurality of wheels, each of said wheels operably connected to one end of said axial spindle;
   (e) a collar member positioned upon the other end of said axial spindle;
   (a) a pivot member having a shaft member fixably secured to said collar member of said axial spindle;
   (g) a first rotatable collar member connected to the upward extending end portion of said shaft member, said first rotatable collar member having a substantially 90 degree radius opening positioned therein;
   (h) a second rotatable collar member connected to the downwardly extending end portion of said shaft member; and
   (i) a pin element carried by said shaft member and positioned therein so that one end portion of said pin element communicates with said opening in said first collar member thus controlling the pivoting movement of said wheels of said caster wheel means.

4. The frame means according to claim 3 wherein said pivot member is provided with an adjusting means mounted on said first collar member of said pivot member and said adjusting means communicates with said 90 degree radius opening therein so that upon operating said adjusting means the degree of pivoting of said wheels of said caster wheel means can be reduced to less than 90 degrees when desired.

5. The frame means according to claim 3, wherein said cylinder and piston means comprises:
   (a) a first and second support means, such pivotally connected at one end to a bracket mounted on said support beam and pivotally attached to said first and second rotatable collar members of said pivoting means at the other end, said first and second support means being maintained in a spaced relationship perpendicular to said pivoting member and having said collar member of said axial spindle positioned between said first and second support means; and
   (b) a hydraulic cylinder having a reciprocating shaft member and the end of said shaft member is pivotally connected to either of said first or second support means and the hydraulic cylinder is pivotally connected to the other of said first or second support means at its end removed from said shaft member, said cylinder and piston means being constructed and assembled so that upon activation of said hydraulic cylinder and thus said shaft member, the wheel of said caster wheel means is raised or lowered in response to the movement of said shaft member.

6. The frame means according to claim 5, wherein said first and second support means each comprises a pair of support bars maintained in a spaced parallel relationship and having said pivot member positioned therebetween at the end furthest removed from said support beam.

References Cited

UNITED STATES PATENTS

| | | | |
|---|---|---|---|
| 2,095,417 | 10/1937 | Messersmith. | |
| 2,828,597 | 4/1958 | Moore | 172—456 X |
| 2,944,615 | 7/1960 | Clark | 172—456 |
| 2,966,219 | 12/1960 | French | 172—289 |
| 3,190,367 | 6/1965 | Kopaska | 172—456 |
| 3,288,480 | 11/1966 | Calkins | 172—456 X |
| 3,414,064 | 12/1968 | Foster | 172—311 |

LEO FRIAGLIA, Primary Examiner